United States Patent [19] — [11] 4,072,898

Hellman et al. — [45] Feb. 7, 1978

[54] REMOTE CONTROL RADIO SYSTEM

[75] Inventors: Robert R. Hellman, Bridgeport; Douglas M. French, Clinton, both of Conn.

[73] Assignee: Westport International, Milford, Conn.

[21] Appl. No.: 585,249

[22] Filed: June 9, 1975

[51] Int. Cl.² .............................................. H04B 1/00

[52] U.S. Cl. ...................................... 325/37; 325/392; 325/395; 343/225; 340/167 A

[58] Field of Search ................. 325/37, 142, 143, 390, 325/391, 392, 395, 396; 340/167 A, 183, 205, 206; 343/225-228; 179/15 AW; 318/16, 599, 606

[56] References Cited

U.S. PATENT DOCUMENTS

| | | | |
|---|---|---|---|
| 2,788,476 | 4/1957 | Shaw | 325/37 |
| 3,162,857 | 12/1964 | Sanders | 325/143 |
| 3,257,651 | 6/1966 | Feisel | 179/15 AW |
| 3,372,393 | 3/1968 | Cataldo | 343/225 |
| 3,449,720 | 6/1969 | Marino et al. | 340/167 R |
| 3,582,783 | 6/1971 | Hendrickson | 325/37 |
| 3,858,116 | 12/1974 | Friedl et al. | 325/37 |

OTHER PUBLICATIONS

P. 263 of the textbook by Black on "Modulation Theory", copyright 1953.

Heath kit assembly manual on "5 Channel Digital Proportional Radio Control System", Model GD-19, pp. 102-117, June 1969.

*Primary Examiner*—Robert L. Griffin
*Assistant Examiner*—Jin F. Ng
*Attorney, Agent, or Firm*—E. M. Junkins

[57] ABSTRACT

A system for individually adjusting a plurality of remotely located servo units according to the position of a manual control for each servo unit by transmitting a carrier wave that is switched on and off for division into repeating sequences with each sequence having a segment for each servo unit and with each segment including a broadcast period and a silent period with the duration of the silent period being related to the position of the segments' manual control for controlling the adjustment of the servo unit by pulse width modulation.

11 Claims, 4 Drawing Figures

REMOTE CONTROL RADIO SYSTEM

The present invention relates to controlling the position of each of a plurality of servo units in accordance with the position of an adjustable manual control for each servo unit. In many remote control devices, such as model planes or boats, there are a plurality of components, such as the throttle, rudder, etc., which are moved by adjustment of its own servo unit. An operator has a manually operable control for each servo unit and manually moves it to a desired position which is transmitted as information in a radio wave to the remote device which then decodes the information into electrical signals for causing the servo unit to be moved to assume an essentially same relative position as its manual control.

One form of radio system for transmitting such information is called pulse position modulation. The radio wave is keyed, i.e., switched off and on, so as to be subdivided into repeating sequences with each sequence having at least a time segment for each control and servo unit with the segments appearing in the same identical location in each sequence. Each segment consists of an "on" time and an "off" time of the radio wave with the duration of the "on" or broadcast time being varied according to the position of the control and the "off" time being essentially constant. The receiver in the remote device detects the duration of the segment into a control signal of the same duration as the segment and applies it to its servo unit which in turn assumes a position that corresponds to such a duration.

While such systems have been found workable, Federal regulations have increased the maximum broadcast power in the frequency bands where such systems may transmit. An attempt to broadcast with heretofore known systems at such higher power would drastically reduce the usable time obtainable from the battery source of electrical energy that normally powers the portable radio transmitter in the system. Further, as other types of radio systems may also have broadcast waves in these bands, generally at the maximum permitted power, heretofore known radio wave receivers in the remote device have been quite susceptible to interference from such other extraneous broadcast waves which could produce undesirable deviation of the servo units from the adjustment commanded by the positions of their manual controls.

It is accordingly an object of the present invention to provide a remote control radio system which though having a higher broadcast power than heretofore known systems, utilizes less electrical energy than such systems and hence may provide control for a longer period from an identical power source.

Another object of the present invention is to achieve the above object with a system that is rendered quite immune to possible interference by extraneous broadcast waves and/or by spurious signals.

A further object of the present invention is to provide a remote control radio system that while achieving the above objects provides precise control over each servo unit by reason of the repetition rate of the commands given each servo unit and which is capable of controlling at least as large a number of servo units as heretofore known systems.

Still another object of the present invention is to provide a remote control radio system that uses pulse position modulation to transmit information of the position of the manual control, which is economical to manufacture, durable in use and compatible with presently existing servo units.

In carrying out the present invention, the remote control system uses an essentially conventional transmitter, which may be either FM or AM, and which either broadcasts a constant amplitude and frequency carrier wave when switched on or does not broadcast when switched off. The broadcast and silent periods and their durations are used to subdivide the broadcast wave into repeating sequences, each of which has a plurality of segments with each segment having a broadcast period and a silent period. However, rather than broadcasting the position information of a control by the duration of the broadcast period in a segment, the present invention transmits the position by the duration of the silent period in the segment. The broadcast period is made to be of essentially constant duration in each segment rather than the off time as in other heretofore known pulse position modulation remote control systems.

Utilization of the variable duration of the silent period for transmitting information drastically decreases the electrical energy required for broadcasting. A typical heretofore known "on" type transmitting system may have an eight segment neutral sequence that extends over 20 milliseconds with a total broadcast on time of 16 msec. and a total off time of about 4 msec., a ratio of 4 to 1. However, the present system transmitting the same information, has a 15½ msec. sequence with a total broadcasting time of the transmitter wave reduced to 5½ msec. and the off time increased to 10 msec., a ratio of 1 to about 2. Accordingly, the same amount of energy obtainable from the battery source that powers the portable transmitter can broadcast longer and/or with a higher power than such heretofore known systems.

The receiver in the remotely located device detects the broadcast wave and supplies a control signal to each servo unit for the duration of its segment as with heretofore known pulse width modulation systems, thereby making the present invention compatible with existing servo units.

In use, a receiver is tuned to receive the broadcast wave from the transmitter and it is incapable of not receiving extraneous waves from other transmitters of the same frequency as the broadcast wave. However, in the present receiver, even though it receives such extraneous waves, it is in effect inhibited, i.e., made completely non-responsive to such extraneous waves for a generally longer time in each segment and sequence than it is responsive to a received wave. This large non-responsive time renders the system, during such times, immune to possible interference from broadcast waves thereby increasing the reliability of the present system as opposed to known systems that were generally continuously on or receptive to broadcasted waves for most if not all of the duration of each segment and sequence.

Other features and advantages will hereinafter appear. In the drawing

Figure 1:
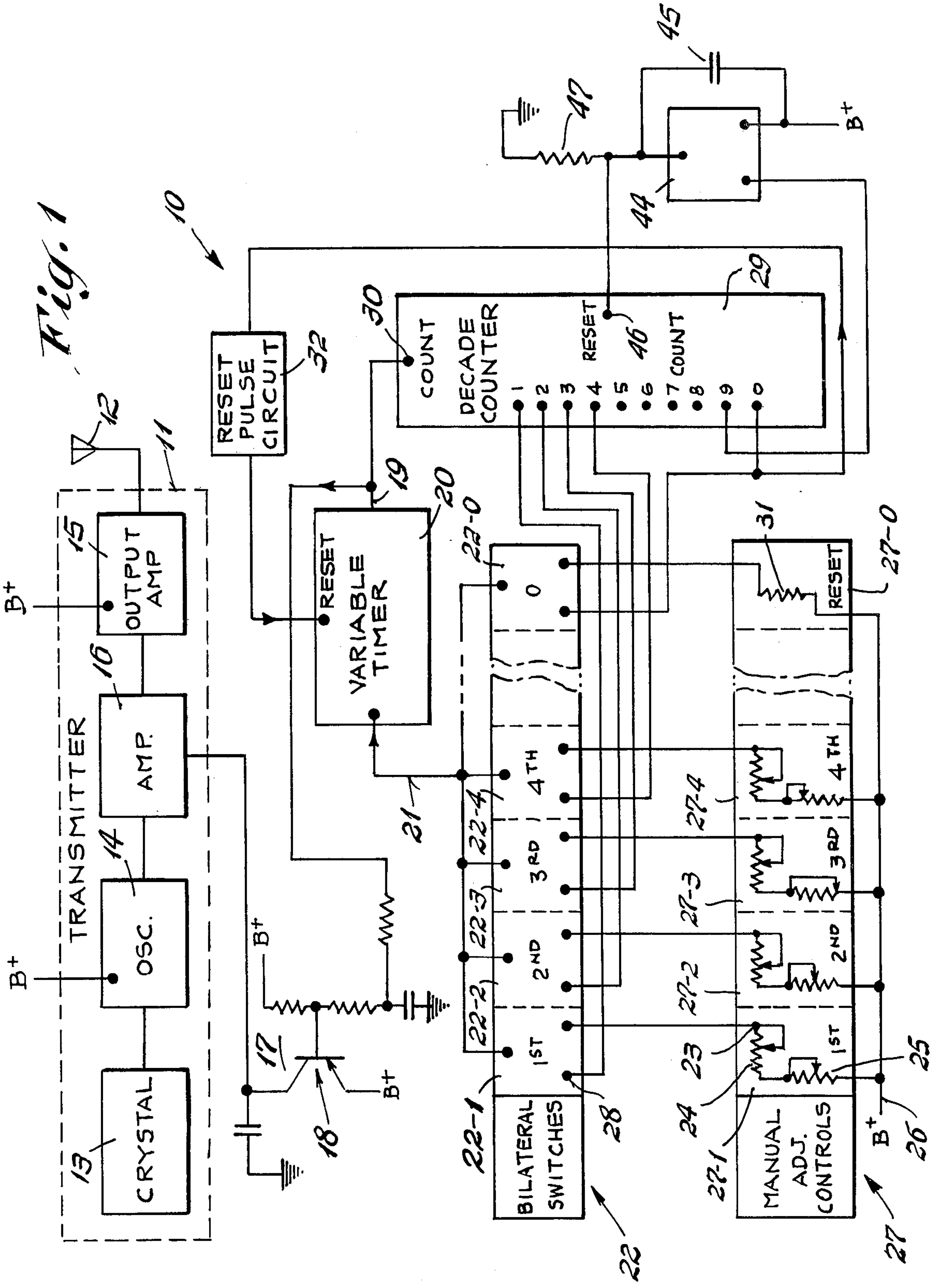
FIG. 1 is a block and electrical schematic diagram of the transmitter of the present invention of a remote control radio system.

Referring to the drawing, the transmitter is generally indicated by the reference numeral 10 and includes within a dotted block 11, the basic components of an AM transmitter. The frequency of the wave transmitted by an antenna 12 is set by the frequency of a crystal 13, and is without amplitude modulation, so that the wave thus broadcasted, is at one continuous frequency and amplitude. An oscillator 14 is connected directly to a source of electrical energy denoted B+ to which an output amplifier 14 is also connected. However, an amplifier 16 is connected to the B+ source by way of a switching circuit generally indicated by the reference numeral 17 which includes a transmitter 18 having a base connected to an output 19 of a variable rate timer 20.

The timer output 19 alternates between low and high voltages and whenever the output is low, the transmitter 18 is caused to conduct, energizing the amplifier 16 and causing the transmitter 10 to broadcast a radio wave at the frequency determined by the crystal 13. Whenever the timer output 19 is high, the transistor 18 is non-conducting, the amplifier 16 is unenergized, and there is no broadcasting of the radio wave, producing a silent period.

The shift in voltage on the output 19 is quite abrupt and the resistors and capacitors connected with the transistor 18 in the switching circuit tend to round off the switching of the transistor and reduce spurious emissions outside the authorized band of the broadcasted wave frequency.

The power consumed by the transmitter when not broadcasting is basically insignificant. Also, the frequency of the broadcasted wave may be altered by altering the crystal frequency or by substituting a different frequency crystal within either of the approved 27 or 72 $MH_z$ ranges.

Figure 4:
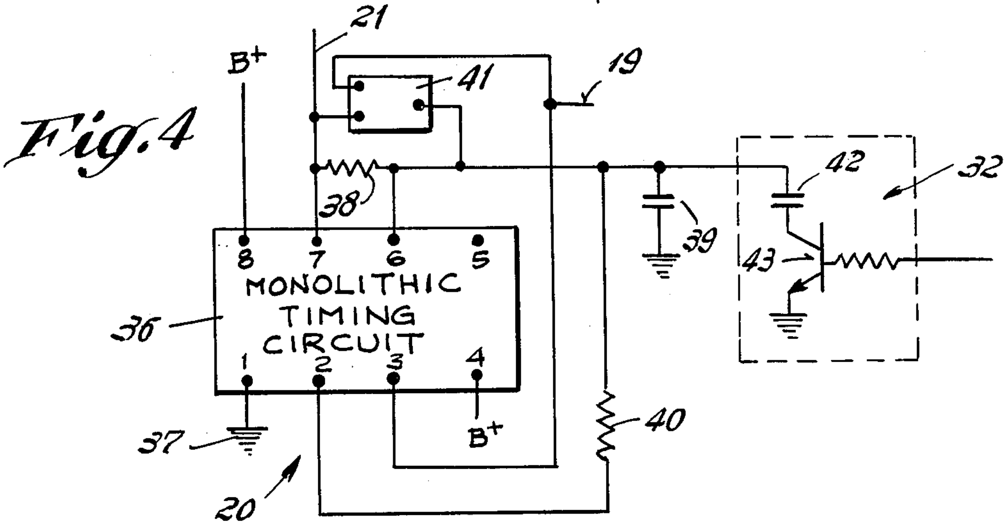
FIG. 4 is a block and schematic diagram of one embodiment of a variable rate timer that may be used in the present transmitter.

One form of a variable timer 20 is shown in FIG. 4, (to be hereinafter specifically referred to) and it is made to function to produce a high output voltage for a duration determined by the value of current flow in he connection to an input lead 21 thereof. After such an adjustable high duration, the timer normally has its output have a fixed duration of low voltage. It then reverts to the high output voltage. A high value of current flow connected to the input lead 21 will cause a short high duration while a low value of current flow will produce a long high duration. Preferably in this system, the ratio of the extents of the low and high durations are on the order of 1 to 3. Thus, by varying the current flow to the input lead 21, the total duration of the high voltage duration and the fixed low voltage duration may be altered to produce pulse position modulation.

In the embodiment shown, input lead 21 is connected in parallel to the outputs of nine bilateral switches, generally indicated by the reference numeral 22 and individual denoted 22-1, 22-2, etc., to 22-0. An input of the first bilateral switch 22-1 is connected to an end 23 of an adjustable resistor 24 that is connected in series with an other adjustable resistor 25 to a B+ voltage source 26. The position of the tap of the adjustable resistor 25 basically sets the current flow through the bilateral switch 22-1 to the input lead 21 with its most downward position effecting the most current flow and its most upward position effecting the least current flow. The adjustable resistor 24 is basically used as a trim resistor to adjust the resistance which should be present for the mid-position setting of the resistor 25 for a neutral current flow.

The components 23–25 constitute one of a plurality of manual controls generally indicated by the reference numeral 27 with these specific components constituting the first control 27-1. Similarly a second control indicated by the reference character 27-2 and third and fourth controls, 27-3 and 27-4 are also provided and each has its output connected only to its respective bilateral switch 22-2, 22-3 and 22-4, respectively. Other controls, as for example, fifth through eight inclusive, may also be provided, if desired, while the ninth control 27-0 is denoted a reset control and is not used for remotely controlling a servo unit. The controls 27-1 through 27-8 are identical.

The bilateral switch 22-1 further includes an enable terminal 28 which, when energized, permits the current flow from the first control 27-1 to be applied to the input lead 21. In the absence of energization of this enable terminal, there is no connection through the bilateral switch between a manual control and the input lead 21. The enable terminal 28 of switch 22-1 is connected to a count 1 terminal of a decade counter 29. Thus, whenever the counter 29 has a count of 1, the current flow from the 1st control 27-1 becomes the only input to the timer 20 through the lead 21. Similarly, for the counter counts of 2 through 8, the other bilateral switches are enabled to cause each's associated manual control 27 to be effectively connected to the input lead 21 but only for the time that the counter has its associated count.

The decade counter 29 has a count terminal 30 and a low to high voltage change thereon causes the counter to increment its count by 1. The count terminal 30 is connected to the timer output 19 and the counter count will only change when the timer output voltage shifts from low to high which occurs after the fixed low voltage duration. Thus each of the first eight counts of the counter has a duration which is the sum of the broadcast period and the silent period of the broadcast wave and such sum is hereinafter referred to as a segment.

The segments occur sequentially as the counter increments its count causing each manual control 27 to be sequentially connected to the timer 20 to enable the control setting thereof to set the duration of the silent period of each segment and hence vary the total duration of each segment.

After the counter has counted to 8, producing eight segments, it is desired to produce a reset pulse of unique duration to provide an indication in the transmitted wave to the receiver that the counter count will begin repeating by the next segment being associated with count 1. The reset pulse is made unique by having at least a relatively long broadcast period. As used herein the successive segments and a reset pulse constitute a sequence which are continuously repeated with the reset pulse and each segment having the same location in each sequence.

At the finish of the count 8 segment, the counter increments to a count of 9 which within a few microseconds causes the counter to be changed to a 0 count by being reset in a manner to be hereinafter described.

A reset pulse is produced when the counter has a count of 0 by the bilateral switch 22-0 connecting the fixed resistor 31, in the control 27-0, to the timer input 21. The resistor 31 has a value to produce a high voltage timer output of a selected duration while the duration of the low voltage timer output is increased, perhaps to three times the fixed low voltage timer output duration, by a reset pulse circuit 32 that is also connected to the timer 20. After these two different durations, the timer output automatically changes to a high voltage to cause the counter to assume a 1 count to repeat the next sequence of segments.

Figure 3:
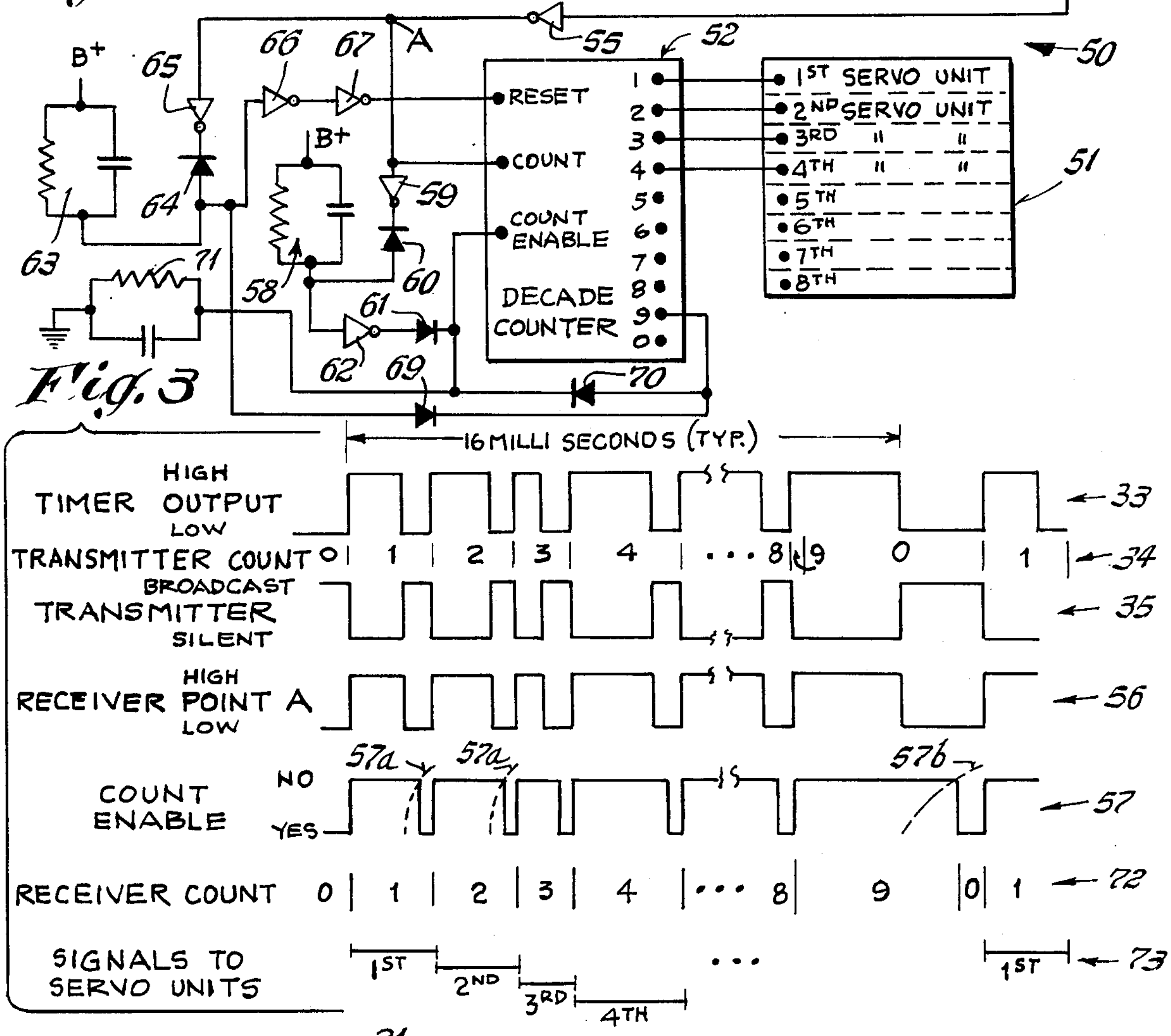
FIG. 3 is a plot of different wave forms that are present in the system.

In FIG. 3 a plot of at least one complete sequence of the timer output is indicated by the reference numeral 33, of the simultaneous counter count 34 and of the transmitter energization 35. It is desired as with heretofore known systems to have each of the eight segments to have a duration of between 1 and 2 msec. and for the reset pulse to have a minimum broadcast duration of 1½ msec. with a silent reset pulse duration being the difference between the sum of the former and a typical duration of a sequence capable of controlling eight servo units of about 16 milliseconds. Each segment is considered to have a typical duration of 1κ milliseconds which occurs when its control is at its mid-point neutral position. With such durations, each servo unit will receive about 60 control signals per second which make the servo units sufficiently satisfactorily responsive to the manual controls.

Both manual controls 27-1, 27-2 are shown set at their neutral position so that they produce a timer high voltage output of 1 msec. while the control 27-3 is shown set for a minimum duration of 0.5 msec. and the fourth control 27-4 is shown set for the longest duration of 1.5 msec. The low voltage timer output for each segment is 0.5 msec. For the reset pulse, when a count of 0 occurs, the high voltage output duration is 2 msec. (set by the value of the resistor 31) while the low voltage duration occurs for 1.5 msec.

The switching circuit 17 only permits broadcasting during the low voltage duration of the timer output and is silent as indicated for the high voltage durations. Thus, the wave 35 is the inverse of the timer output voltage wave and as shown, for each segment, the transmitter only broadcasts for a period of 0.5 msec. being silent for the remainder of the segment. The reset pulse, of course, produces a longer broadcasting time and a selectable silent period.

Shown in FIG. 4 is a block and schematic diagram of the timer 20 and the reset pulse circuit 32. A block 36 represents a linear integrated circuit constituting a monolithic timing circuit and is available by its stock number of Ne555 from Signetics Corporation, Sunnyvale, California. The circuit has eight terminals with terminals 8 and 4 being connected to a B+ source while terminal 1 is connected to ground 37. The input lead 21 is connected to the terminal 7 which, through a resistor 38 is connected to the terminal 6. In addition, a capacitor 39 is connected between ground and terminal 6 while a lead from terminal 2 through a resistor 40 is also connected to terminal 6. A bilateral switch 41 also has its output connected to terminal 6 while its enable terminal is connected to terminal 3 and its input terminal to the input lead 21. It will be noted that terminal 3 also constitutes the output 19.

In this timer, the capacitor 39 will become charged through the lead 21 and bilateral switch 41, when the output lead 19 has a high voltage, at a rate essentially determined by the value of the current flow connected to the input lead 21. When the voltage thereacross equals about two-thirds of the value of B+, it triggers the circuit internally to cause the output voltage on terminal 3 to change from a high to a low value and causes terminal 7 to become grounded to allow the capacitor 39 to discharge through the resistor 38. When the value of the charge on capacitor 39 reaches one-third the value of the B+ voltage, the circuit is triggered through resistor 40 through terminal 2 to open the ground on terminal 7 and causes its output to shift to a high voltage. The condenser 39 begins charging again to two-thirds of the value of the B+ voltage at which time it will again cause a shift to a low output voltage until the capacitor 39 discharges to achieve a value of one-third that of the B+ supply when the output voltage is shifted toa high value. Thus, the values of resistor 38 and capacitor 39 basically set the duration of the low voltage output while the charging rate of the capacitor 39 through the lead 21 determines the duration of the high voltage output.

The reset pulse circuit 32 includes a capacitor 42 and a transistor 43 which causes the capacitor 42 to be connected in parallel with the capacitor 39 whenever the transistor 43 conducts and which occurs when the counter count is 0. This increases the effective capacitor capacity and increases the time necessary for both capacitors to discharge through the resistor 38 to the one-third B+ value necessary to shift the timer output to a high voltage. The values of the components of the reset circuit 32 are selected to produce preferably the low voltage duration of 1.5 msec, while the value of resistor 31 is set to produce a charging time of both capacitors of about 2 msec. for the high voltage.

With respect to the reset pulse occurring when the counter count is incremented to 9, a bilateral switch 44 has an enable terminal connected to the B+ source. A capacitor 45 is connected between the output thereof and the B+ source. Further, the output is connected to a reset terminal 46 in the counter 29 which when energized by a positive pulse sets the counter count to 0. A resistor 47, connected to the ground, completes the circuit. The components 45 and 47 constitute a delay circuit of perhaps a few microseconds to assure that the reset terminal 46 will be actuated reliably after the counter has attained a count of 9 and sets the time that the reset pulse appears on the reset terminal 46.

It will be noted on plot 33, that the counter count of 9 is so short as to not produce any change in the timer output. The timer output after achieving a high output voltage after the count of 8, is caused to remain high for the time set by the value of resistor 31. For the typical 16 msec. sequence and eight controls, the high time would be about 2 msecs.

If it is desired to have a lesser number of servo units to be operated by the system as for example four, this may easily be achieved by disconnecting the lead to the count 9 terminal and connecting it to the count 5 terminal (i.e.) the count one higher than the number of servo units). Such a sequence would then include four segments and the reset pulse which would typically provide a sequence time of only 8 msec. This doubles the rate at which control signals are applied to the servo units. If it is preferred to maintain the typical duration of a sequence at about 16 msec., the value of resistor 31 could be increased to increase the high voltage duration of the timer output for an additional 6 msec. needed to complete the desired duration of the sequence. Thus, when the count of 5 is reached, the timer output becomes continuously high for 8 msec. which includes the previously mentioned 2 msecs. of the silent duration of the reset pulse.

It will be noted that during this extended high duration produced by the value of the resistor 31 that the transmitter is not energized and will be silent and hence the total braodcast time during such a sequence will be even less than the total broadcast time for a sequence for eight controls.

Figure 2:
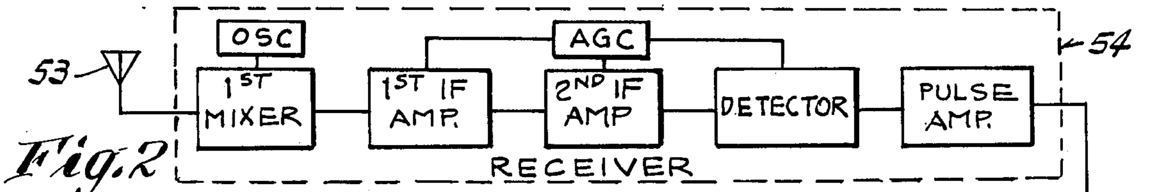
FIG. 2 is a block and schematic diagram of the receiver.

The broadcast wave is received by a receiver generally indicated by the reference numeral 50 in FIG. 2 and is located in the device to be remotely controlled. The eight servo units are generally indicated by the reference numeral 51. The servo units are identical and of conventional construction so that they operate on a positive pulse of between about one to two msecs. width with a peak to peak voltage of 4.8 vols or so when the B+ supply in the receiver is 5 volts. Each of the servo units is connected to its similarly numbered count terminal of a decade counter 52. Each servo unit will thus assume a position dictated by the duration that its count exists which in turn is the duration that the segment in the sequence for tht count also exists.

An antenna 53 directs a received wave to receiver components enclosed within a dotted line block 54 with the output thereof being the input to an inverting amplifier 55. The input is the detected broadcast wave having a high voltage during broadcast periods and a low voltage during silent periods while the output of the inverting amplifier 55 has voltage values essentially simultaneously identical to the timer voltage output 19. For convenience, this output is denoted A. As shown in the plot in FIG. 3 indicated by he reference numeral 56, the point A has high and low voltages which are essentially identical to the timer output voltages shown in plot 33.

The point A is directly connected to the count terminal of the counter 52 and will cause the counter to increment upon a change in voltage from low to high. However, the counter also includes a count enable terminal that must simultaneously have a low voltage thereon to enable such a voltage change to increment the count. An enabling state only occurs for the yes periods indicated in the plot 57 in FIG. 3 and specifically it exists for the latter half of the duration of the broadcast wave of a segment.

The enabling state is produced by an enable timing circuit 58 that is connected directly to a B+ source and to the point A through an inverting amplifier 59 and a diode 60. The enable terminal is also connected to the timing circuit 58 through a diode 61 and an inverting amplifier 62, connected as shown.

With this structure, a low voltage at the point A will produce a high voltage at the diode 60 which causes the timing circuit 58 to increase its voltage until it achieves a value which, when inverted by the amplifying inverter 62, is of the value necessary to constitute a low state at the count enable terminal. In the plot 57, the increasing voltage of the count enable timing circuit 58 is shown by dotted lines 57*a* and about one-half of its maximum value is needed to actuate the count enable terminal of the counter. The one-half value is reached in approximately 0.25 milliseconds of low voltage at the point A so that the counter is only enabled for the remainder of the broadcast duration of a segment or about 0.25 milliseconds to have its count changed. At all other times, any volages on the count terminal are inhibited from incrementing the counter count and hence the present receiver is rendered substantially immune from the effects of extraneous signals for a substantial duration of each segment.

The counter 52 is capable of being reset to a 0 count by a high voltage on its reset terminal which is obtainable from a reset timing circuit 63 whenever a broadcast wave reset pulse is detected. The point A is connected through a diode 64 and an inverting amplifier 65 to the timing circuit 63 which is connected through two inverting amplifiers 66 and 67 to the reset terminal. Upon the broadcast period of the reset pulse appearing at the point A as a low voltage, the voltage in the timing circuit 63 will increase positively until it achieves a value which is sufficient after amplification by the amplifier 66 and 67 to trigger the reset of the counter and change the counter count to 0. Preferably the components of the timing circuit 63 are selected to require a duration of about 1 msec. of low voltage at the point A before the triggering voltage value is achieved providing a reset voltage to the reset terminal of about 0.5 msec. duration. The increasing voltage is indicated by the dotted line 57*b* in the plot 57.

A diode 69 is connected to the count 9 terminal and to the junction of the diode 64 and amplifier 65. Another diode 70 is connected between the count 9 terminal and the count enable terminal. Further a pull down resistor 71 with a few microsecond capacitor delay is connected between the count enable terminal and ground.

With the above construction, after the point A has attained a high voltage at the end of the count 8 segment, it increments the counter 52 to a 9 count. An inhibiting voltage is placed on the count enable terminal through the diode 70 while the cathode of diode 69 is placed at a high voltage. The counter maintains the 9 count until the reset timing circuit achieves a value of positive voltage that triggers the counter 52 to reset to a 0 count. This removes the inhibiting voltage on the count enable circuit by a discharge path through the resistor 71 and also removes the reset voltage by a discharge path thrugh the diode 69. Further, the enabling low voltage on the count enable terminal from the enable timing circuit 58 which has been present since shortly after the beginning of the broadcast wave of the reset pulse becomes enabling with the removal of the positive voltage from the 9 count terminal. The counter 52 is accordingly "enabled" and with a 0 count so that the end of the reset pulse effects incrementing the counter count to 1 to begin the new sequence.

In a plot 72 in FIG. 3 the durations of the control signals applied to each of the four servo units by the setting of their respective controls is shown. Also plot 73 indicates the counter counts for the receiver counter 52.

It will be noted that during the non-broadcast periods when the point A has a high volage that both timing circuits 58 and 63 by reason of their respective amplifying inverters 59 and 65 have their output voltage rapidly decreased.

While the above pertains to systems having 8 manual controls and 8 servo units in the receiver, if the transmitter is modified to a lesser number, as for example, four manual controls, the receiver is also modified. Thus assuming four controls and four servo units, the only change required would be to disconnect the diodes 69 and 70 from the 9 count terminal and connect them to the 5 count terminal. The receiver will function in the same manner as above described, maintaining this count until about 1 msec. of the reset pulse has appeared.

While there has been shown a decade counter in both the transmitter and receiver in the specific embodiment shown, it will be clear that different maximum count counters may be employed if desired.

It will accordingly be understood that there has been disclosed a remote control radio system for causing a plurality of servo units to each assume a position dictated by the position of an adjustable control for each. The system produces broadcast periods and silent periods to subdivide a wave into repeating sequences with each sequence having a plurality of segments, one for each adjustable control and its associated servo unit. Each segment has a broadcast period and a silent period and information of a control's position by modulating the duration of the silent period. As the silent periods are normally longer than the broadcast periods, the system is capable of greater and longer transmitting than in heretofore known systems in addition to increasing the reliability of the system by rendering it immune to extraneous waves for longer intervals.

Variations and modifications may be made within the scope of the claims and portions of the improvements may be used without others.

We claim:

1. A remote radio control system for positioning a servo unit in accordance with the setting of an adjustable control comprising broadcast means for broadcasting a radio wave upon energization, means for energizing the broadcast means to provide a broadcast period and for effecting deenergization of the broadcast means to provide a silent period with a broadcast period and a silent period constituting a segment, means interconnected with the adjustable control for adjusting the duration of the silent period in accordance with the setting of the adjustable control; radio wave receiving means for remotely receiving the wave and providing a detected signal having one state for an extent essentially corresponding to the broadcast period and another state for an extent essentially corresponding to the silent period, means connected to receive the detected signal and interconnected with the servo unit for producing and applying a control signal to the servo unit that is related to the extent of the another state with the servo unit assuming a position dictated by the control signal; in which the system has a plurality of servo units, in which there is at least one individually adjustable control for each servo unit, in which the means for energizing the broadcast means causes a plurality of successive segments with the plurality of segments constituting a sequence and in which there are means for associating each adjustable control with only one segment in the sequence, in which the radio wave receiving means provides a detected signal fcr each segment, in which the means for producing and applying produces a segment control signal for each segment detected signal and applies each segment control signal to only one servo unit whereby each segment in the sequence dictates through its segment control signal the position of a servo unit in accordance with the setting of its associated one of the adjustable controls, in which there are means for energizing and deenergizing the broadcast means to produce a reset broadcast period in each sequence, and in which the last named causes the duration of each broadcast period of each segment to be essentially constant and to have the duration of the reset broadcast period be a multiple of the duration of a broadcast period for a segment.

2. A remote radio control system for positioning a servo unit in accordance with the setting of an adjustable control comprising broadcast means for broadcast a radio wave upon energization, means for energizing the broadcast means to provide a broadcast period and for effecting deenergization of the broadcast means to provide a silent period with a broadcast period and a silent period constituting a segment, means interconnected with the adjustable control for adjusting the duration of the silent period in accordance with the setting of the adjustable control; radio wave receiving means for remotely receiving the wave and providing a detected signal having one state for an extent essentially corresponding to the broadcast period and another state for an extent essentially corresponding to the silent period, means connected to receive the detected signal and interconnected with the servo unit for producing and applying a control signal to the servo unit that is related to the extent of the another state with the servo unit assuming a position dictated by the control signal; in which the system has a plurality of servo units, in which there is at least one individually adjustable control for each servo unit, in which the means for energizing the broadcast means causes a plurality of successive segments with the plurality of segments constituting a sequence and in which there are means for associating each adjustable control with only one segment in the sequence, in which the radio wave receiving means provides a detected signal for each segment, in which the means for producing and applying produces a segment control signal for each segment detected signal and applies each segment control signal to only one servo unit whereby each segment in the sequence dictates through its segment control signal the position of a servo unit in accordance with the setting of its associated one of the adjustable controls; in which a sequence has a typical desired segment sequence duration, in which the sum of the durations of the segments in the sequence is less than the desired segment sequence duration and in which the means for deenergizing the broadcast means produces a silent period for the difference between the desired segment sequence duration and the sum of the segment durations.

3. A remote radio control system for positioning a servo unit in accordance with the setting of an adjustable control comprising broadcast means for broadcasting a radio wave upon energization, means for energizing the broadcast means to provide a broadcast period and for effecting deenergization of the broadcast means to provide a silent period with a broadcast period and a silent period constituting a segment, means interconnected with the adjustable control for adjusting the duration of the silent period in accordance with the setting of the adjustable control; radio wave receiving means for remotely receiving the wave and providing a detected signal having one state for an xtent essentially corresponding to the broadcast period and another state for an extent essentially corresponding to the silent period and means connected to receive the detected signal and interconnectedwith the servo unit for producing and applying a control signal to the servo unit that is related to the extent of the another state with the servo unit assuming a position dictated by the control signal, and in which the receiving means is capable of receiving an extraneous radio wave similar to the broadcast wave during a silent period and providing an extraneous detected signal having the one state for the extent of the extraneous wave and in which the applying means includes means for normally ignoring any extraneous one state detected signal.

4. The invention as defined in claim 3 in which the ignoring means ignores extraneous one state detected signals that have an extent at least less than approximately one-half of the extent of the one state that essentially corresponds to the broadcast period.

5. A remote receiver for receiving a command in the form of a radio wave having a broadcast period and a silent period for the pulse width modulation positioning of a servo unit comprising means for receiving the radio wave and providing one state of a detected signal having an extent essentially corresponding to the broadcast period and another state having an extent essentially corresponding to the silent period, means for accepting the detected signal and interconnected with the servo unit to produce and apply a pulse width modulated control signal essentially equal in extent to the sum of the two extents of the detected signal to the servo unit, said receiving and applying means being capable of receiving a radio wave that is extraneous to the command and providing a one state extraneous detected signal related in extent to the extent of the received extraneous wave and means for inhibiting the accepting means from altering the duration of the control signal by a one state extraneous detected signal having a duration less than essentially half of the extent of a one state of the detected signal caused by a received broadcast period.

6. The invention as defined in claim 5 in which the inhibiting means inhibits altering for all extents of the another state caused by the silent period.

7. A remote radio control system for positioning a servo unit in accordance with the setting of an adjustable control comprising broadcast means for broadcasting a radio wave upon energization, means for energizing the broadcast means to provide a broadcast period and for effecting deenergization of the broadcast means to provide a silent period with a broadcast period and a silent period constituting a segment, means interconnected with the adjustable control for adjusting the duration of the silent period in accordance with the setting of the adjustable control; ratio wave receiving means for remotely receiving the wave and providing a detected signal having one state for an extent essentially corresponding to the broadcast period and another state for an extent essentially corresponding to the silent period and means connected to receive the detected signal and interconnected with the servo unit for producing and applyin a control signal to the servo unit that is related to the extent of the another state with the servo unit assuming a position dictated by the control signal, in which the system has a plurality of servo units, in which there is at least one individually adjustable control for each servo unit, in which the means for energizing the broadcast means causes a plurality of successive segments with the plurality of segments constituting a sequence and in which there are means for associating each adjustable control with only one segment in the sequence, in which the radio wave receiving means provides a detected signal for each segment and in which the means for producing and applying produces a control signal for each segment detected signal and applies each segment control signal to only one servo unit whereby each segment in the sequence dictates through its control signal the position of a servo unit in accordance with the setting of its associated one of the adjustable controls and in which the applying means includes means for shifting the control signal to the associated servo unit at the beginning of each segment and means for inhibiting the shifting means for at least during the whole extent of the another state of the detected signal for a segment.

8. The invention as defined in claim 7 in which the applying means includes a counter having a count terminal and a count enable terminal and in which the inhibiting means includes a connection to the count enable terminal for applying a nonenabling voltage thereto.

9. The invention as defined in claim 7 in which the inhibiting means further inhibits the shifting means during a portion of the extent of the one state of the detected signal of a segment.

10. The invention as defined in claim 9 in which the inhibiting means portion is made by the inhibiting means to be at least as long as the beginning of one-half of the extent of the one state of the detected signal of a segment.

11. The invention as defined in claim 10 in which the detected signal has the another state precede the one state in each segment and in which the means for shifting is rendered effective to shift to the associated signal by the change from the one state of the detected signal to the another state of the detected signal.

* * * * *